April 30, 1957     J. L. AYER     2,790,253

FILTER DEMONSTRATION DEVICE

Filed July 30, 1953

INVENTOR.

BY John L. Ayer

Herman Seid
Atty.

United States Patent Office 2,790,253
Patented Apr. 30, 1957

2,790,253
FILTER DEMONSTRATION DEVICE

John L. Ayer, Manlius, N. Y., assignor, by mesne assignments, to Cambridge Filter Corporation, a corporation of New York Application July 30, 1953, Serial No. 371,283

2 Claims. (Cl. 35—49)

This invention relates to a demonstration device and, more particularly, to a demonstration device for demonstrating the efficiency of filter materials.

One of the problems inherent in the manufacture and sale of filter materials resides in the difficulty of demonstrating visually the effectiveness or efficiency of the filter to a prospective customer. This problem becomes more acute as the efficiency of the filter increases because it is difficult to demonstrate satisfactorily a filter which removes particles in size five microns or less.

The chief object of the present invention is to provide a demonstration device which permits visual observation of the effectiveness or efficiency of filter materials demonstrated to a prospective customer.

An object of the present invention is to provide a simple, economical demonstration device for demonstrating visually to a prospective customer the effectiveness of a particular filter material under trial.

A further object is to provide a simple demonstration device containing a filter material which demonstrates visually the manner in which the filter material effectively removes small smoke, dust or dirt particles carried in an air stream directed through the filter material. Other objects of the invention will be readily perceived from the following description.

This invention relates to a demonstration device for demonstrating the efficiency of filter materials. The device includes a first funnel-shaped member, a second funnel-shaped member and filter material, the efficiency of which is to be demonstrated, securely held between said members. Means are provided to secure the members and the filter material as an assembly. An air stream containing smoke, for example, may be directed through the filter material, thus demonstrating visually the effectiveness of the filter material in removing tar and smoke particles from the air stream.

Figure 1:
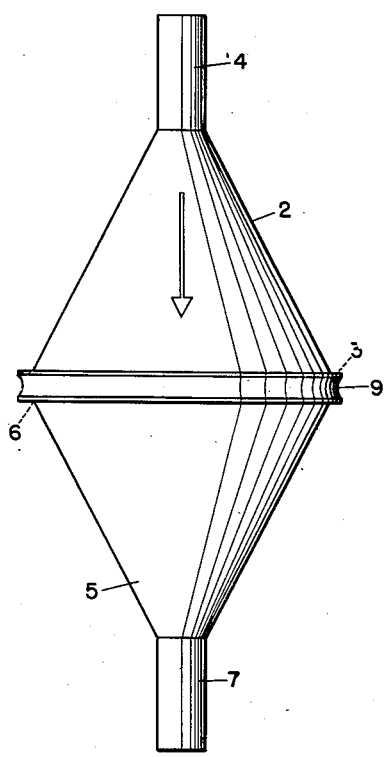
Figure 2:
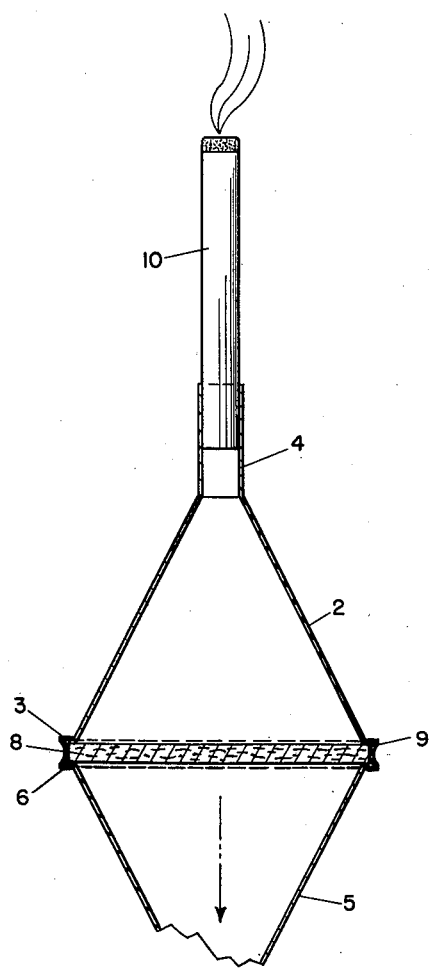

The attached drawing illustrates a preferred embodiment of the invention, in which Figure 1 is a view in elevation of the demonstration device of the present invention; and Figure 2 is a sectional view of the demonstration device.

Referring to the attached drawing, there is shown the demonstration device of the present invention. This device includes a funnel-shaped member 2 having a flange 3, surrounding the mouth thereof and a spout or tube 4 extending from the opposite end. A second funnel-shaped member 5 is provided having a flange 6 surrounding its mouth and a spout or tube 7 extending from the opposite end.

Interposed between members 2 and 5 and clamped between flanges 3 and 6 is a sheet of filter material 8 to be tested to demonstrate visually the effectiveness or efficiency thereof. A sealing band 9 extends about the peripheries of members 2 and 5 and filter material 8 to secure the members and filter material as an assembly and to prevent leakage of air about the edges of the filter material.

It will be observed that members 2, 5 in cooperation with filter material 8 forms adjacent chambers, the filter material forming a wall of the chambers. The members 2, 5 form an air passage in which the filter material is disposed, extending across the passage.

Considering the operation of the demonstration device, a cigarette or other suitable smoke or dust generating material 10 is placed in spout 4 for example. The mouth of the observer is then applied to spout 7, the observer inhaling to draw smoke of the cigarette into the device. It will be observed member 2 is filled with smoke while a reduced amount of smoke has passed through the filter 8 into member 5. It will be appreciated that the device provides a simple and effective way of demonstrating the efficiency of the filter material.

While the present device may be employed to demonstrate the efficiency of any filter material employed for filtering dust or dirt particles for example from an air stream, I have found it particularly effective when employed with a filter material such as disclosed in United States Patent No. 2,507,827, granted May 16, 1952, to Earl Stafford and Horace M. Lee, since this particular filter material possesses extremely high efficiency. The filter material consists of a substantially uncompacted and homogenized mixture of mineral fibers, short organic fibers and long organic fibers. A furnish satisfactory for formation of the filter material is as follows: 5% caroa fiber, 47.5% precut viscose fiber, 47.5% precut purified cotton fiber. To this furnish may be added from 3 to 15% of mineral fiber such as asbestos fibers. In the above furnish other reinforcing fibers such as Manila hemp, rag fiber and the like may be used in place of the caroa fiber. Other short fibers may be substituted for the viscose fibers and cotton fibers. It is important that the mineral fibers have a diameter of less than about three microns. These fibers are mixed and formed into a sheet which is about fifty one-thousandths of an inch or less in thickness in accordance with usual practice.

While I have described member 2 and member 5 as being funnel-shaped in contour, it will be appreciated other configurations might be employed, if so desired.

The present invention provides a simple, economical demonstration device for demonstrating visually the effectiveness of a filter material. The device does not require skill in its use and may be used for its intended purpose by unskilled persons.

While I have described a preferred embodiment of the present invention, it will be understood the invention is not limited thereto since it may be otherwise embodied within the scope of the following claims.

I claim:

1. In a demonstration device for demonstrating visually the efficiency of filter materials, the combination of a first transparent funnel-shaped member, a second transparent funnel-shaped member, at least one of said members containing a pocket to receive a substance capable of rendering air passing into the member unclean, flanges extending from said members, filter material, the efficiency of which is to be demonstrated, placed between said members and clamped between the flanges thereof and a sealing band surrounding the flanges and filter material to seal a passage through said members and to secure the members and filter material as an assembly.

2. A device according to claim 1 in which the filter material comprises a homogenous mass of cellulose fibers predominantly a few millimeters in length mixed with a comparatively small quantity of mineral fibers of a diameter of less than about 3 microns and formed into a sheet which is fifty one-thousandths of an inch or less in thickness.

(References on following page)

References Cited in the file of this patent

UNITED STATES PATENTS

| | | |
|---|---|---|
| 1,517,144 | Anderson | Nov. 25, 1924 |
| 2,079,474 | Walsh | May 4, 1937 |
| 2,112,304 | Rhea | Mar. 29, 1938 |
| 2,184,406 | Troxler | Dec. 26, 1939 |
| 2,184,433 | Reed | Dec. 26, 1939 |
| 2,228,371 | Shaw | Jan. 14, 1941 |
| 2,613,454 | White | Oct. 14, 1952 |
| 2,638,688 | Hazelton | May 19, 1953 |